(12) United States Patent
Lehr et al.

(10) Patent No.: US 7,083,173 B2
(45) Date of Patent: Aug. 1, 2006

(54) DUAL DENSITY FOAM CORE SPORTS BOARD

(75) Inventors: Gregory S. Lehr, Coronado, CA (US); Timothy G. Leonard, San Diego, CA (US)

(73) Assignee: Wham-O, Inc., Emeryville, CA (US)

( * ) Notice: Subject to any disclaimer, the term of this patent is extended or adjusted under 35 U.S.C. 154(b) by 0 days.

(21) Appl. No.: 10/898,642

(22) Filed: Jul. 23, 2004

(65) Prior Publication Data

US 2005/0046128 A1 Mar. 3, 2005

Related U.S. Application Data

(63) Continuation of application No. 10/096,359, filed on Mar. 11, 2002, now abandoned.

(51) Int. Cl.
*B63B 35/79* (2006.01)
*B62B 13/06* (2006.01)

(52) U.S. Cl. .................. 280/28.16; 280/18; 441/79
(58) Field of Classification Search ............. 280/28, 280/28.16, 18, 845, 610, 14.27, 14.28; 441/65, 441/74, 79

See application file for complete search history.

(56) References Cited

U.S. PATENT DOCUMENTS

| | | | |
|---|---|---|---|
| 2,139,513 A | 12/1938 | Nelson et al. | |
| 3,147,020 A | 9/1964 | Dahl | |
| 3,169,779 A | 2/1965 | Haab | |
| D216,530 S | 2/1970 | Ziff | |
| 3,512,195 A | 5/1970 | Porsche | |
| 3,616,020 A | 10/1971 | Whelan et al. | |
| 3,794,341 A | 2/1974 | Torok | |
| 3,937,482 A | 2/1976 | Johnson | |
| 3,952,354 A | 4/1976 | Turner | |
| 4,028,761 A | 6/1977 | Taylor | |
| 4,129,911 A * | 12/1978 | McDonald et al. | 441/74 |
| 4,267,615 A * | 5/1981 | Nealy | 441/74 |
| 4,561,664 A | 12/1985 | Cashmere | |
| 4,708,675 A * | 11/1987 | Shoeffler et al. | 441/74 |
| 4,850,913 A | 7/1989 | Szabad, Jr. | |
| 4,961,715 A | 10/1990 | Shanelec | |
| 5,137,483 A * | 8/1992 | Nealy | 441/74 |
| 5,154,655 A * | 10/1992 | Glydon | 441/74 |
| 5,211,593 A * | 5/1993 | Schneider et al. | 441/74 |
| 5,224,890 A * | 7/1993 | Moran | 441/74 |
| 5,247,898 A * | 9/1993 | Thornlimb | 114/246 |
| 5,275,860 A | 1/1994 | D'Luzansky et al. | |
| 5,295,883 A * | 3/1994 | Moran | 441/74 |
| 5,338,237 A * | 8/1994 | Nealy | 441/74 |
| 5,503,921 A | 4/1996 | Chang et al. | |
| 5,647,784 A * | 7/1997 | Moran | 441/74 |
| 5,658,179 A * | 8/1997 | Glydon et al. | 441/74 |
| 5,904,970 A | 5/1999 | Lauer et al. | |
| 5,916,672 A * | 6/1999 | Reeves et al. | 428/319.9 |
| 5,928,045 A * | 7/1999 | Szabad | 441/74 |
| 5,934,961 A | 8/1999 | Mehrmann et al. | |
| 6,054,005 A | 4/2000 | Hurley et al. | |
| 6,106,345 A | 8/2000 | Yeh | |

(Continued)

*Primary Examiner*—Jeff Restifo
(74) *Attorney, Agent, or Firm*—Kolisch Hartwell, P.C.

(57) ABSTRACT

A sports board with an expanded foam core that has a density adapted so the core will receive a solid sheet skin laminated directly thereto without an adhesive layer. The sports board includes a bottom solid sheet skin laminated directly to a bottom surface of the expanded foam core, and a foam top skin laminated to a top surface and heeled to side surfaces of the expanded foam core.

7 Claims, 3 Drawing Sheets

U.S. PATENT DOCUMENTS

| | | |
|---|---|---|
| 6,167,790 B1 | 1/2001 | Bambara et al. |
| D449,253 S | 10/2001 | Fireman et al. |
| 6,492,013 B1 * | 12/2002 | Ramesh .................... 428/308.4 |
| 6,669,519 B1 * | 12/2003 | Metrot ........................ 441/65 |
| 6,736,689 B1 * | 5/2004 | Renard et al. ................ 441/65 |
| 2003/0127812 A1 * | 7/2003 | Mehrmann et al. ...... 280/14.21 |
| 2003/0205872 A1 * | 11/2003 | Mehrmann ................... 280/28 |
| 2004/0176001 A1 * | 9/2004 | Yeh ............................. 441/74 |

* cited by examiner

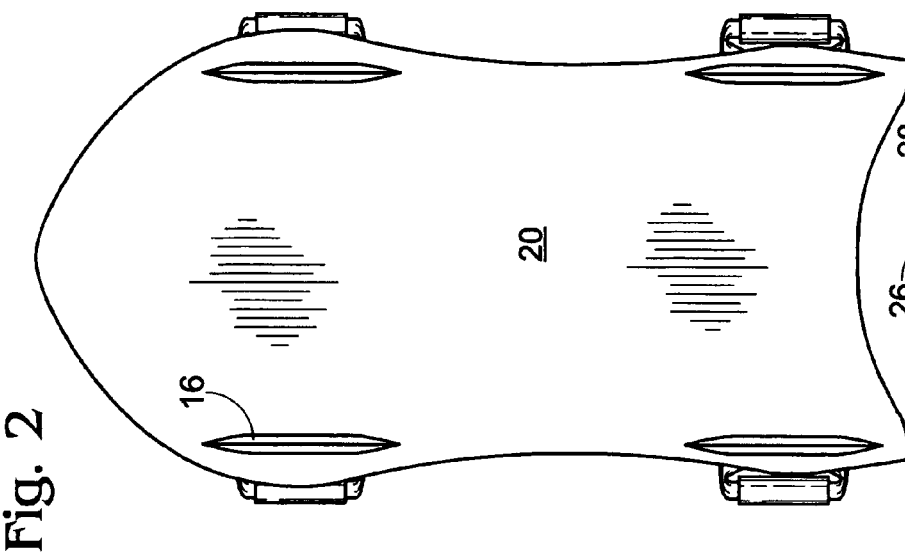
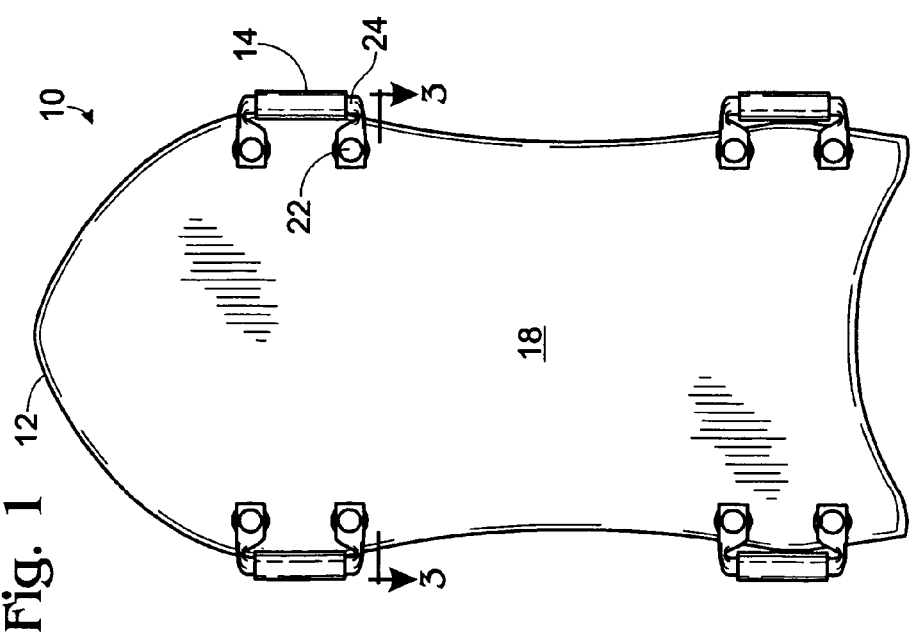
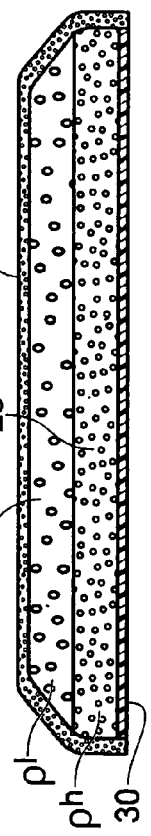

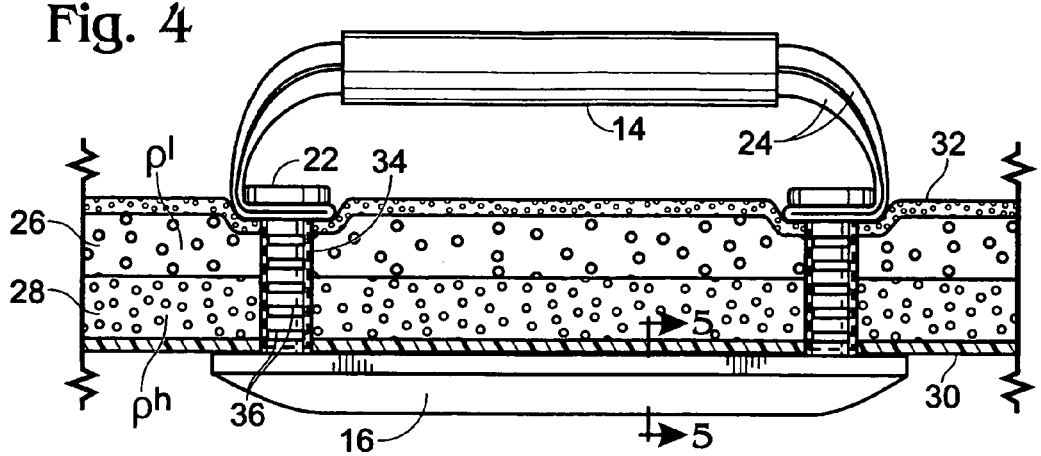
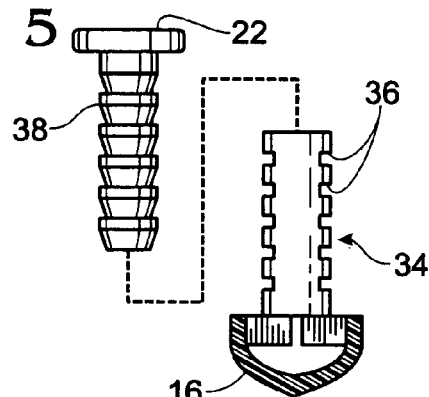
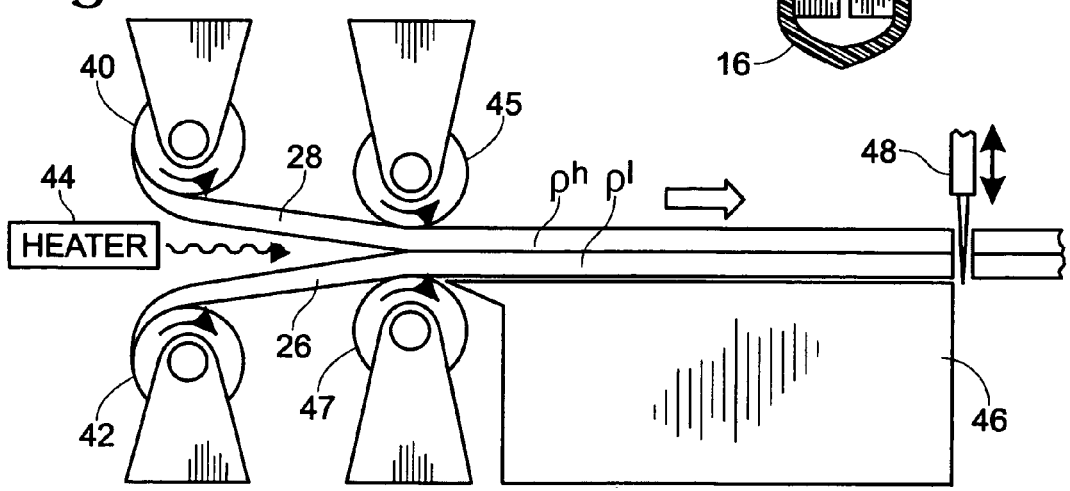
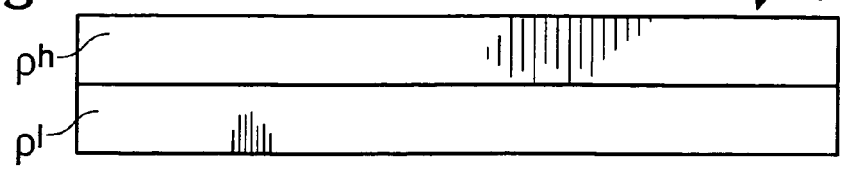

DUAL DENSITY FOAM CORE SPORTS BOARD

CROSS-REFERENCE TO RELATED APPLICATION

This application is a continuation of U.S. patent application Ser. No. 10/096,359, filed Mar. 11, 2002, now abandoned, which is incorporated herein by reference in its entirety for all purposes.

FIELD OF THE INVENTION

The present invention relates generally to sports boards. More specifically, the invention relates to sports boards having two densities of foam core.

BACKGROUND OF THE INVENTION

Sports boards are popular for a variety of recreational activities, such as snow sledding, body boarding, surfing, etc. Wham-O, Inc.'s BOOGIE BOARD® body boards have been used for years by children and adults for sport in ocean surf and to cool off, in an entertaining way, on warm summer days. Similarly, Wham-O, Inc.'s SNOWBOOGIE® sleds have been used for recreation on winter days. Typical sports boards use an expanded foam core, a foam skin laminated to the top and side surfaces, and a solid skin having a thin foam backing laminated along the bottom surface. An example of a typical sports board is shown in U.S. Pat. No. 4.850,913 to Szabad. The sports board in Szabad includes a polyethylene film laminated to a polyethylene foam sheet to form a composite film/sheet laminate that is then laminated onto a polyethylene core. The laminated solid skin improves durability and reduces drag as the sports board slides along the snow or through the water. One problem with laminating a solid skin to the bottom of the sports board is that for proper adhesion between the solid skin and the core a thin foam-backing layer must be laminated to the solid skin prior to laminating the skin to the core of the board. Only after the foam-backing layer has been applied can the solid skin be laminated to the bottom surface of the sports board. If a solid skin was laminated directly to the core, either the core would blister, or the skin would be too rough and lack toughness.

Another problem with typical sports boards is the stiffness requirements of the core of the board make it uncomfortably firm. Often relatively dense expanded polymer foam must be used as the core to create a sports board with the proper stiffness. Using a dense expanded foam results in an uncomfortably hard board for a user to kneel or lie on.

Yet another problem encountered in sports boards is that with a slick solid skin laminated to the bottom surface the boards are not easily steered. A sports board constructed of foam lacks hard sharp edges that can be used to carve turns in the snow or water.

It would be desirable to develop a sports board that is easy to manufacture, has the needed stiffness, while including a comfortable surface for riding, and has a structure that enables greater steering control. Greater comfort may be achieved through the use a multi-layer expanded foam core, where each layer had a different density. A top layer may have a softer density for comfort, while a lower layer may have a higher density providing needed stiffness.

SUMMARY OF THE INVENTION

A sports board with an expanded foam core that has a density adapted so the core will receive a solid sheet skin laminated directly thereto without an adhesive layer. The sports board includes a bottom solid sheet skin laminated directly to a bottom surface of the expanded foam core, and a foam top skin laminated to a top surface and heeled to side surfaces of the expanded foam core. The sports board may also include a dual density foam core.

BRIEF DESCRIPTION OF THE DRAWINGS

FIG. 1 is a top plan view of a sports board according to one embodiment of the present invention.

FIG. 2 is a bottom plan view of the sports board of FIG. 1.

FIG. 3 is a cross-sectional view of the sports board of FIG. 1, taken along line 3—3.

FIG. 4 is the partial sectional view of the sports board of FIG. 1, showing a handle attached thereto.

FIG. 5 is the cross-sectional view of a runner of the sports board of FIG. 1, taken along line 5—5, showing the assembly of a snap rivet with the runner.

FIG. 6 is a schematic view of a foam core lamination process for making a sports board.

FIG. 7 is a sports board foam core blank having two different foam densities.

DETAILED DESCRIPTION AND BEST MODE OF THE INVENTION

Figure 8:
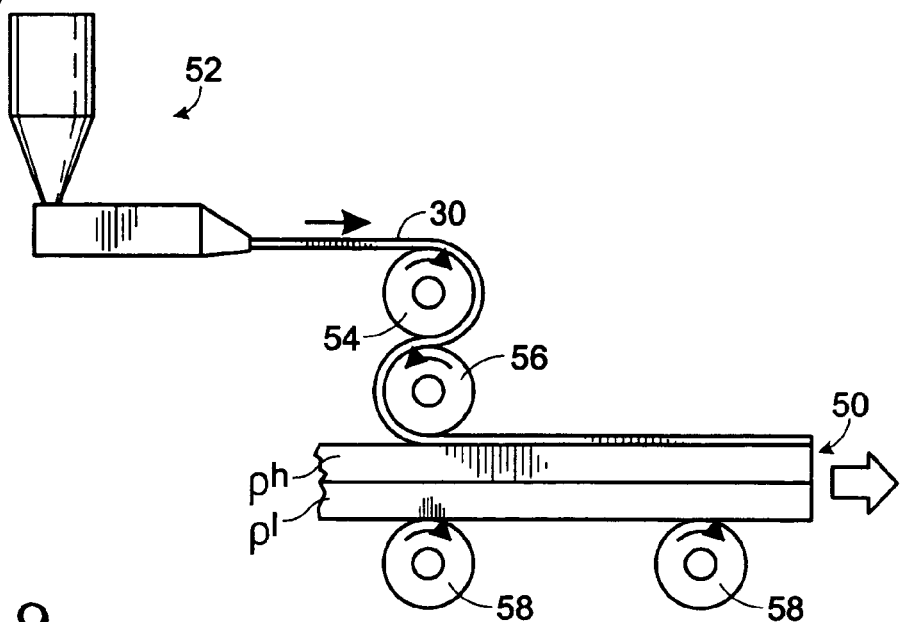
FIG. 8 is a schematic view of a solid sheet laminating process for making a sports board.

A sports board according to one embodiment of the present invention is shown in FIGS. 1 and 2, generally indicated at 10. Sports board 10 may be a body board, a sled, or similar recreation board for sliding along water or snow. Sports board 10 includes a body 12 having handles 14 and runners 16 connected thereto.

Body 12 includes a top surface 18, shown in FIG. 1, and a bottom surface 20, shown in FIG. 2. The top surface of the sports board includes handles 14 mounted thereto. The bottom surface of the sports board includes runners 16 mounted thereto. Handles 14 may be configured for a person to grip when using the sports board. Children, for example, may use sports board 10 for sliding on snow by gripping handles 14 with their hands and lying prone on top surface 18 of body 12. Runners 16 may be configured to aid in steering the sports board while sledding. Children, for example, may steer sports board 10, while sliding down hill on snow, by shifting their weight from side to side causing the runners to dig into the snow and carve a turn.

As shown in FIGS. 1 and 2, sports board 10 includes four handles 14 and four runners 16. It should be understood that other handle configurations and runner configurations may be used with the present invention. Further, it should be understood that in some applications, such as a sports board for surfing, runners 16 may take the form of fins configured to aid in steering the sports board gliding through the water. The position of runners 16 may be moved according to the activities for which the sports board is designed.

Handles 14 are secured to body 12 using snap rivets 22 and strap 24. Each strap 24 is threaded through each handle 14 and snap rivet 22 is inserted through an aperture (not shown) in strap 24 securing the strap to body 12 of board 10, as will be further explained below with reference to FIG. 4.

It should be noted that handles 14 may be positioned on body 12 in other locations and that there may be any number of handles 14.

A cross-section of sports board 10, taken along line 3—3 of FIG. 1, is shown in FIG. 3. Body 12 of sports board 10 includes a first core section 26, a second core section 28, a solid sheet bottom skin 30, and a foam sheet top skin 32. First core section 26 has a first density $\rho^l$. Similarly, second core section 28 has a second density $\rho^h$. First density $\rho^l$ is less that second density $\rho^h$. First density $\rho^l$ may be in the range of around 1.0 pounds per cubic foot (PCF) to 1.5 PCF, and preferably first density $\rho^l$ may be around 1.2 PCF. Second density $\rho^h$ may be in the range of around 1.7 PCF to 3.0 PCF, and more preferably second density $\rho^h$ may be around 2.2 PCF. By having a density of 2.2 PCF, core section 28 may be optimized for bonding to skin 30.

Solid bottom skin 30 may be a solid polymer sheet having a low coefficient of friction to enhance the performance of the sports board. Solid bottom skin 30 may be in the range of 6 to 25 mils thick, and more preferably around 15 mils thick. Solid bottom skin 30 may be made of extruded polyethylene or other polyolefins. The thickness of skin 30 may be selected to optimize bonding to second core section 28 and durability of sports board 10.

Foam sheet top skin 32 may be a high-density polymer foam sheet having a relatively thin thickness. Skin 32 may have a density in the range of about 4 to 10 PCF, preferably 6 PCF, and a thickness in the range of about 0.100 to 0.150 inches, preferably 0.125 inches. Skin 32 may be textured and have a tackiness to prevent a rider from slipping off of sports board 10 while riding.

In FIGS. 4 and 5, the coupling of handle 14 and runner 16 through body 12 is shown. Strap 24 is threaded through handle 14 and secured to body 12 by snap rivet 22. Strap 24 may be any suitable flexible material such as nylon webbing. Strap 24 includes apertures (not shown) in each end sized to enable the snap rivet 22 to pass through the end of the strap. Snap rivet 22 may be adapted to couple with a snap post 34 that extends upward from runner 16. Snap post 34 includes snap slots 36 that are configured to engage snap rivet 22 and retain the rivet after it has been inserted into the snap post. As illustrated in FIG. 5, snap rivet 22 includes snap segments 38. As shown, snap segments 38 are frusto-conical shape and are configured to snap into successive snap slots 36 until all the snap segments are completely inserted. As shown in FIG. 4, snap posts 34 are inserted from the bottom of body 12 upwardly through apertures in the body. Snap rivets 22 are then inserted from the top of body 12 downwardly through the apertures in straps 24 and into snap post 34. As snap rivet 22 inserts into snap post 34, snap segments 38 engage snap slots 36 securing handle 14 to runner 16 through the body of sports board 10.

Runner 16 may be a hard plastic or similar material adapted to keep sports board 10 tracking along in a single direction. Runners 16 further enable a rider to cause the sports board to turn by shifting the rider's weight on the sports board enhancing the play value of the sports board. As shown in FIG. 5, runner 16 has a narrow lower end configured to keep the sports board on track in the snow, traveling in the direction pointed by the rider.

Figure 9:
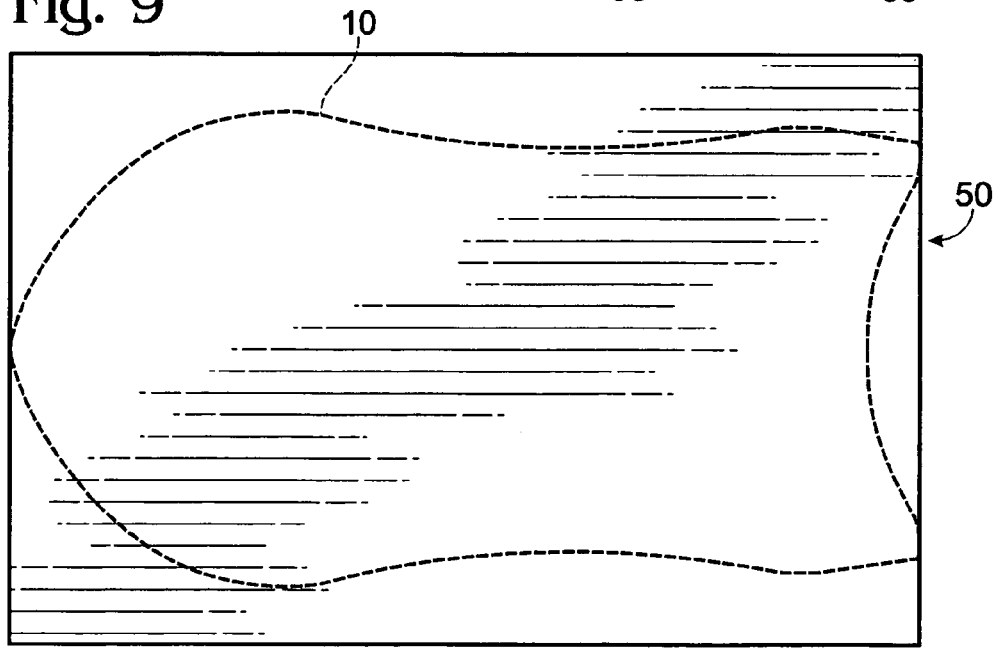
FIG. 9 is a plan view of a sports board shape to cut out of a laminated sports board blank.

One method of manufacturing sports boards according to the present invention is illustrated in FIGS. 6–10. First, two extruded foam core materials having different densities are laminated together and cut into sports board blanks, as shown in FIGS. 6 and 7. Second, bottom skin 30 is extruded and directly laminated onto the sports board blanks, as shown in FIG. 8. Third, the sports board blanks are cut into the shape of sports boards and a foam top skin is laminated onto each cut sports board, as shown in FIG. 9. Finally, the foam top skin is heeled around the sides of the core completing the sports board.

In FIGS. 6 and 7, a roll 40 of foam having density $\rho^h$ is positioned above a roll 42 of foam having density $\rho^l$. Foam rolls 40, 42 may be closed cell polyethylene foam or other suitable expanded polymer closed cell foams having the required material properties, such as density, modulus of elasticity, etc. Both foam rolls 40, 42 feed foam past a heater 44 and into laminating rolls 45 and 47. The foam of roll 40 having density $\rho^h$ will become the second foam core section 28 and the foam of roll 42 having the density $\rho^l$ will become first foam core section 26. Heater 44 may be any suitable heater, for example, a radiant heater, a hot air heater, or an infrared heater, etc. Heater 44 produces a heating zone at a temperature of around 700° F. for about a 4 inches long segment between foam rolls 40 and 42 and laminating rollers 45 and 47. Traveling through the heating zone softens the two layers of foam to prepare them for laminating between laminating rollers 45 and 47. Laminating rollers 45 and 47 are heated to a temperature of 375° F. to aid in the laminating process. After the two foam layers have been laminated together the laminated material passes over a cooling table 46 cooling table 46 allows the two laminated foam layers to harden again. Finally, once the laminated foam layers are sufficiently cooled and hardened they are cut into sports board blanks by cutter 48. Cutter 48 may be a flying cutter, or other similar cutter that may be used in a continuous manufacturing process. Sport board blank 50 is shown in FIG. 7, and may have dimensions around 1.0 inch thick, 94 inches long, and 48 inches wide. It should be understood that other dimensions for sports board blank 50 are contemplated within the scope of the present invention. Once sports board blank 50 has been formed it is ready to receive bottom skin 30.

Conventional techniques for bonding a solid skin to a foam core require the use of a sacrificial layer of thin foam to be laminated to the solid skin before the skin can be laminated to a thick foam core. The reason for the use of a sacrificial layer has to do with the heat energy carried by the solid sheet when it is at a bonding temperature and the insulating property of thick foam sheets. The solid sheet carries so much heat energy that bonding to a thick highly insulating foam causes the heat energy to build up and melt the foam, resulting in distortions in the surface of the sheet. By applying a thin sheet of foam as a sacrificial or adhesive layer to the solid skin the distortion problem is avoided.

In FIG. 8, the process for extruding bottom skin 30 and laminating it onto sports board blank 50 is shown. By using a higher density foam core and carefully controlling the temperature of the solid skin a direct lamination process is possible without the above described distortion problems. Bottom skin 30 may be extruded out of extruder 52 and feed around tension roller 54 and around laminating roller 56. Laminating roller 56 may be temperature controlled to ensure that bottom skin 30 reaches the laminating point at a temperature of approximately 375° F. Skin 30 may have a temperature higher than 375° F. when it exits extruder 52, and therefore laminating roller 56 may have to be chilled to ensure skin 30 contacts sports board blank 50 at the correct temperature. The density $\rho^h$ of the second core section is optimized to bond directly with bottom skin 30 without distortions. Tension roller 54 may move to collect and release slack in extruded skin 30 to maintain an efficient laminating process. Sports board blank 50 should be fed into the laminating roller 56 with second core section facing upward to receive skin 30. It should be noted that laminating skin 30 to sports board blank 50 may be done prior to cutting the blank. For example, extruder 52 and laminating roller 56 may be used downstream of laminating rollers 45 and 47 prior to the step of cutting the composite core material with cutter 48 into sports board blank 50.

Sports board blank 50 is cut to the size and shape of sports board 10 and has foam top skin 32 laminated thereto, as shown in FIG. 9. Blank 50 may be cut using a die cut process or similar method of shaping the blank to the desired shape of the sports board. Foam top skin 32 may be laminated using conventional laminating techniques directly to core section 26 of body 12.

Figure 10:
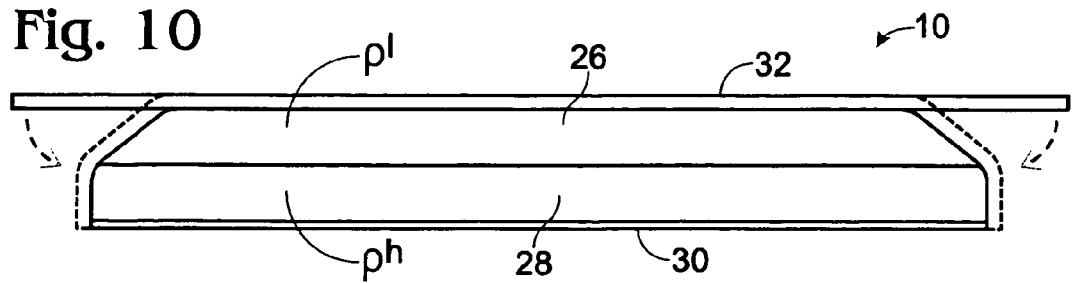
FIG. 10 is a cross-sectional view of a sports board, illustrating the heeling of a top foam skin onto the sports board.

The last step in the manufacture of body 12 is heeling foam top skin 32 to the sides and edges of body 12, as shown in FIG. 10. Heeling may be done by hand application of pressure and heat using irons, or a similar operation. When the heeling process is complete the handles and runners are attached, as discussed above, and the sports board is ready for use.

It is believed that the disclosure set forth above encompasses multiple distinct inventions with independent utility. While each of these inventions has been disclosed in its preferred form, the specific embodiments thereof, as disclosed and illustrated herein, are not to be considered in a limiting sense as numerous variations are possible. The subject matter of the inventions include all novel and non-obvious combinations and sub-combinations of the various elements, features, functions and/or properties disclosed herein. Where claims recite "a" or "a first" element or equivalent thereof, such claims should be understood to include incorporation of one or more such elements, neither requiring, nor excluding two or more such elements.

It is believed that the following claims particularly point out certain combinations and sub-combinations that are directed to one of the disclosed inventions and are novel and non-obvious. Inventions embodied in other combinations and sub-combinations of features, functions, elements and/or properties may be claimed through amendment of those claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

I claim:

1. A sports board comprising:
   a body having an expanded foam core;
   a bottom solid sheet skin directly laminated to the bottom surface of the foam core;
   a top foam skin directly laminated to the top surface and healed onto the sides of the foam core;
   a handle coupled with the body through a flexible strap member; and
   a fixed runner coupled with the body such that the runner is non-movable relative to the body, wherein the handle and the runner couple together though the body of the sports board by a snap rivet passing through the flexible strap member and a snap post receiving the snap.

2. The sports board of claim 1, wherein the snap rivet includes snap segments configured to engage snap slots in the snap post, and wherein the engagement of the snap segments with the snap slots prevents the snap rivet from being removed from the snap post.

3. The sports board of claim 1, wherein the bottom solid sheet skin has a thickness in the range of about 6–25 mils.

4. The sports board of claim 1, wherein the bottom solid sheet skin has a thickness of about 15 mils.

5. The sports board of claim 1, wherein the top foam skin has a density in the range of about 4 to 10 pounds per cubic foot and a thickness in the range of about 0.10 to 0.15 inches.

6. The sports board of claim 1, wherein the top foam skin has a density of around 6 pounds per cubic foot, and a thickness of around 0.125 inches.

7. The sports board of claim 1, wherein the expanded foam core body has an upper first core section having a first density and a lower second core section laminated directly to the first core section wherein the lower second core section has a second density greater than the first density of the upper first core section.

* * * * *